United States Patent [19]

Schmid et al.

[11] Patent Number: 4,917,716
[45] Date of Patent: Apr. 17, 1990

[54] PROCESS FOR PURIFYING A GASEOUS MIXTURE

[75] Inventors: Wolfgang Schmid, Gruenwald; Hans Becker, Munich; Herwig Landes, Weilheim; Hans Jungfer, Planegg, all of Fed. Rep. of Germany

[73] Assignee: Linde Aktiengesellschaft, Wiesbaden, Fed. Rep. of Germany

[21] Appl. No.: 302,283

[22] Filed: Jan. 27, 1989

[30] Foreign Application Priority Data

Jan. 28, 1988 [DE] Fed. Rep. of Germany ....... 3802552

[51] Int. Cl.⁴ ................................................ F25J 3/00
[52] U.S. Cl. ............................................ 62/20; 55/68
[58] Field of Search .................... 62/20, 17; 55/68

[56] References Cited

U.S. PATENT DOCUMENTS

| | | | |
|---|---|---|---|
| 2,844,944 | 7/1958 | Becker | 62/25 |
| 3,312,075 | 4/1967 | Becker | 62/20 |
| 3,654,769 | 4/1972 | Linde | 62/20 |
| 3,899,312 | 8/1975 | Kruis et al. | 62/20 |
| 4,337,072 | 6/1982 | McNeil | 62/20 |
| 4,488,890 | 12/1984 | Foerg et al. | 62/20 |
| 4,511,382 | 4/1985 | Valencia et al. | 62/20 |
| 4,544,390 | 10/1985 | Traficante | 62/20 |
| 4,636,334 | 1/1987 | Skinner et al. | 62/20 |
| 4,765,814 | 8/1988 | Baurer et al. | 62/20 |

Primary Examiner—Ronald C. Capossela
Attorney, Agent, or Firm—Millen, White & Zelano

[57] ABSTRACT

A process is disclosed for the purification of a gaseous mixture, for example, consisting essentially of hydrogen and containing impurities, e.g., carbon monoxide, methane and argon. The gaseous mixture is scrubbed with liquid nitrogen in a scrubbing column having two sections. In order to be able to process the residual gases formed during the scrubbing step, containing especially CO, argon and CH₄, in a simple way and without great investment costs, liquid nitrogen is introduced in a quantity sufficient for an almost complete scrubbing out of the carbon monoxide, and a partial amount of the scrubbing liquid, enriched with carbon monoxide, is withdrawn between the upper and lower sections. The partial amount withdrawn is dimensioned so that the residual quantity of scrubbing agent delivered to the lower section of the scrubbing column is enough to scrub out the methane from the gaseous mixture, but yet also leaves a major portion of the carbon monoxide in the gaseous mixture.

22 Claims, 3 Drawing Sheets

PROCESS FOR PURIFYING A GASEOUS MIXTURE

BACKGROUND OF THE INVENTION

This invention relates to a process for purifying a gaseous mixture by scrubbing with liquid nitrogen in a scrubbing column having two sections. Such processes can, for example, be employed for the purification of a gaseous mixture consisting essentially of hydrogen and containing impurities, e.g., carbon monoxide, methane and argon.

Such a process has been disclosed in German Pat. No. 947,711. In particular, in this conventional procedure a liquid nitrogen fraction poor in carbon monoxide is withdrawn by way of a side tap from an upper part of the bottom section of a scrubbing column. This results in an increase in the carbon monoxide concentration of the remaining scrubbing liquid withdrawn from the very bottom of the scrubbing column.

In the conventional process, a substantial excess of liquid nitrogen is utilized for safety reasons and on account of a lack of reliable calculations. This feature, on the one hand, permits the use of a shorter scrubbing column but, on the other hand, leads to a considerable CO dilution in the bottom of the scrubbing column. The side tap, for this reason, serves in the conventional process for removal of excess scrubbing nitrogen. This is also expressed in the fact that the carbon monoxide concentration in the fraction withdrawn via the side tap only amounts to maximally 5%.

The CO concentration in the bottom, and thus the calorific value of the resultant residual gas fraction, is maximized by the conventional process; however, if the CO is to be used for purposes other than heating, i.e. is converted, the CO must first be separated since the bottom fraction still contains the entire argon and methane that were contained in the feed gas. Such a purification of the CO is both complex and relatively expensive.

SUMMARY OF THE INVENTION

An object of the invention is to provide a process of the type discussed above wherein processing of the residual CO gas from the nitrogen scrubbing operation is substantially simplified and is more economical. A particular object is to provide a process whereby CO recovery and further separation of the bottom product are both facilitated.

Upon further study of the specification and appended claims, further objects and advantages of this invention will become apparent to those skilled in the art.

These objects are attained according to the invention by introducing liquid nitrogen in an amount sufficient for an almost complete scrubbing out of the carbon monoxide, and by withdrawing a partial amount of the scrubbing liquid, enriched with carbon monoxide, between an upper section and a lower section. The amount of scrubbing liquid withdrawn is dimensioned so that the remaining amount of scrubbing agent introduced into the lower section of the scrubbing column is enough to substantially scrub out the methane from the gaseous mixture, but yet the major portion of the carbon monoxide is left in the gaseous mixture.

Although the amount of scrubbing liquid withdrawn between the upper and lower sections is dependent upon the design and operating conditions of the liquid nitrogen scrubbing column, i.e. the numbers of trays in the upper and lower section, the operating pressure and temperature and the amount of impurities present in the gaseous mixture and thus varies also according to the feed composition, the partial amount of scrubbing liquid withdrawn is generally about 10 to 80 mol %, preferably about 20 to 70 mol. % of the total scrubbing liquid delivered to the scrubbing column. Furthermore, the remaining amount of scrubbing liquid which is delivered to the lower section of the scrubbing column is dimensioned so that generally 30 to 98 mol %, preferably 40 to 90 mol %, of the total carbon monoxide present in the gaseous feed mixture is left in the gaseous mixture exiting the lower section. Likewise, this remaining amount of scrubbing agent can be determined in such a way that the gaseous mixture leaving the lower section, and therefore also the scrubbing liquid withdrawn between the upper and lower section, contains only any low methane content, i.e., for example (if the further use of this side stream thus requires) less than 20 or even less than 1 ppm on a molar basis.

A basis for the invention is the factor that, in the conventional process, the carbon monoxide is withdrawn from the bottom of the scrubbing column together with the argon and methane impurities. As a consequence, direct further usage is possible only as a heating gas. However, this is economically disadvantageous due to the relatively high proportion of CO in the residual gas. Further separation of the CO means a considerable additional expenditure in apparatus, which can be avoided by the process of the present invention. The various chemical uses of high purity CO are well known in the literature, for example, the production of hydrogen by means of the shift conversion or the use of CO as a feedstock for various chemical syntheses like the production of acetic or formic acid or methanol.

It proved to be especially advantageous regarding further processing for the partial amount of scrubbing liquid withdrawn between an upper section and a lower section of the scrubbing column to contain at least about 20% CO, preferably more than 30% CO (on a molar basis). The special division of the scubbing column into two sections is achieved, for example by a chimney tray installed in the central portion of the lower half of the scrubbing column. This chimney tray makes it possible to subdivide the amount of scrubbing agent, obtained from the upper section, between a side tap and the lower section. It is advantageous to dimension the amount of scrubbing agent for the lower section so that, in the latter, at least the methane is substantially scrubbed out of the gaseous mixture. By an appropriate choice of the amount of scrubbing agent employed in the lower section, the side tap, i.e. the fraction enriched in CO, can contain an arbitrarily small amount of methane.

It is especially advantageous to perform the process according to the invention so that the CO—enriched fraction contains only a few ppm of $CH_4$, e.g., less than about 20 ppm, if necessary even below 1 ppm. This, in turn, represents an extraordinarily favorable situation for passing the partial amount of scrubbing liquid withdrawn between the upper and lower sections of the scrubbing column on to a pressure swing adsorption unit in order to obtain a pure CO fraction, according to this invention. In this connection, the provision is furthermore made to expand the withdrawn partial quantity of scrubbing liquid, for example in an flash vessel, prior to entering the pressure swing adsorption system and to recycle the thus-liberated hydrogen, for example, to a sour gas unit of an ammonia scrubbing plant, where it is combined with an internal recycle stream, recompressed to the feedgas pressure and fed to the feed gas stream.

In accordance with a further preferred embodiment of the process according to this invention, the partial amount of the scrubbing liquid withdrawn between the upper and lower sections of the scrubbing column is passed on to a CO shift conversion for the purpose of obtaining hydrogen.

With a view toward a maximally complete and variegated utilization of the fractions produced during the scrubbing step, it is expedient to pass on the partial amount of scrubbing liquid withdrawn between the upper and lower sections of the scrubbing column, on the one hand, to a CO shift conversion for producing hydrogen and, on the other hand, to a pressure swing adsorption in order to obtain a pure CO fraction.

In addition, a maximally high economy of the process of this invention can be advantageously achieved by passing the fraction formed in the bottom of the scrubbing column on to an argon production unit.

Thus, the process of this invention affords the advantage, in total, that by the removal of two separate scrubbing agent streams from the scrubbing column, the working up of the residual gas from the nitrogen scrubbing operation is substantially facilitated. In addition, the process becomes more cost-effective since the primary proportion of the carbon monoxide is not first mixed with argon and methane and discharged as a combined stream. Also, the initial investment cost is low as compared with the conventional process, and no additional operating expenses are incurred.

The process of this invention is usable, for example, in all methods for purification of gaseous mixtures consisting essentially of hydrogen wherein a scrubbing step with liquid nitrogen is part of the procedure. One of the important uses for the purified hydrogen is for the production of NH₃ synthesis gas. In any case, the invention is generally applicable to feed gases entering the scrubbing column of the following composition (percent on molar basis):

| Component | min | max |
| --- | --- | --- |
| $H_2$ | 55 | 99 |
| CO | 0,5 | 15 |
| $CH_4$ | 0,01 | 15 |
| Ar | 0,05 | 5 |
| $N_2$ | 0,01 | 30 |

In the scrubbing column employed in the invention, the lower section generally contains 2 to 20 theoretical plates, preferably 3 to 15 theoretical plates. The upper section of the scrubbing column generally contains 15 to 80 theoretical plates, preferably 20 to 60 theoretical plates.

If required by special conditions, e.g. due to limitations arising from the fact the scrubbing column is integrated in a cold box, it is evident that, instead of one column with two sections also two separate columns can be used.

The entire texts of all applications, patents and publications, cited above, and of corresponding German application No. P 38 02 552.3 (the priority document), are hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein.

DETAILED DESCRIPTION

In the following description, all percentages and ppm are on a molar basis if not otherwise indicated.

Figure 1:
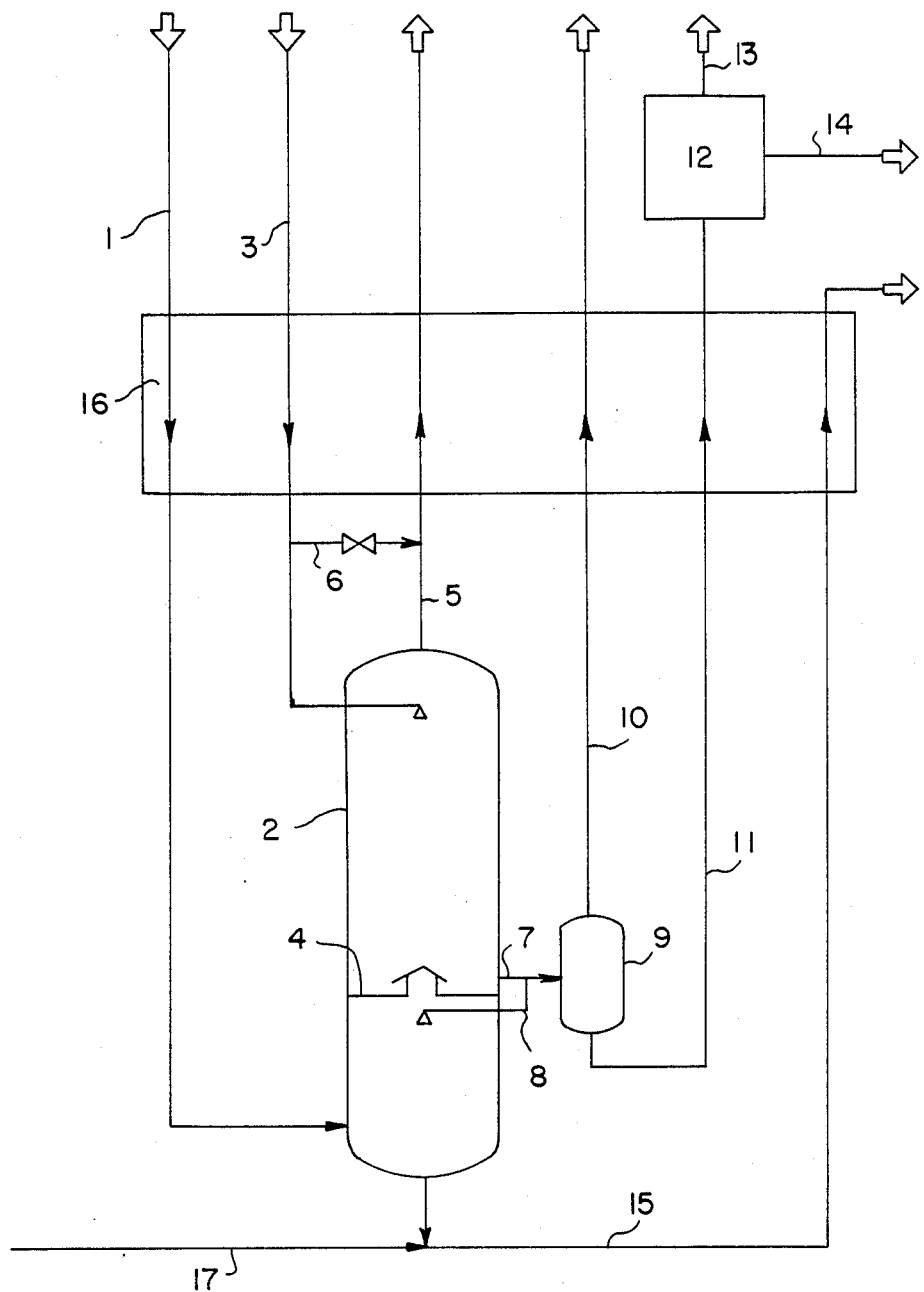
FIG. 1 illustrates a nitrogen scrubbing operation with $H_2$ recycling and production of high purity CO by pressure swing adsorption.

According to FIG. 1, a crude gas mixture consisting of

| 96.72% | $H_2$ |
| --- | --- |
| 0.18% | $N_2$ |
| 2.31% | CO |
| 0.55% | argon and |
| 0.24% | $CH_4$ | is introduced via conduit 1 at a temperature of 85K and under a pressure of 73.4 bar into a scrubbing column 2. As the scrubbing agent, liquid high-pressure nitrogen still contaminated with 0.02% argon and 0.001% $O_2$ is fed to the scrubbing column 2 at the head by way of conduit 3 at a temperature of likewise 85K. As the partial pressure of nitrogen in the feedgas (0.13 bar) is well below the vapor pressure of nitrogen at 85K (2.5 bar), the gas is saturated with nitrogen by evaporation of the necessary amount of liquid nitrogen, thus lowering the operating temperature of the column. Therefore, the temperature of the streams exiting the column is lower than the feed temperature.

A chimney tray 4, installed in the lower third of the scrubbing column 2, subdivides the scrubbing column 2 into two sections in such a way that 26 theoretical plates are provided above the chimney tray 4 and six theoretical plates are provided there below. In this way, a gaseous mixture with 91.19% $H_2$, 8.81% $N_2$ as well as 1 ppm CO and 10 ppm Ar leaves the scrubbing column 2 overhead via conduit 5 at a temperature of 80.5K and a pressure of 73.2 bar.

When using the overhead gaseous mixture as a synthesis gas for $NH_3$ production, it is possible to produce a stoichiometric mixture by means of high-pressure nitrogen fed via conduit 6.

Above the chimney tray 4, the scrubbing liquid enriched with carbon monoxide is withdrawn by way of a side tap 7 and, after a partial stream 8 thereof has again been recycled into the lower section of the scrubbing column 2, is passed on to flash vessel 9 at a temperature of 80.6K. After expansion to, for example, 25 bar, a gaseous stream containing essentially solely hydrogen and having the following composition:

90% $H_2$ 6.36% $N_2$ 3.28% CO 0.36% argon is withdrawn via conduit 10 and delivered, for example, to a sour gas scrubbing unit (not shown) within an $NH_3$ production system.

From the bottom of the flash vessel 9, an almost $CH_4$-free fraction enriched in carbon monoxide is removed (conduit 11), containing 4.89% $H_2$ 51.01% $N_2$ 37.48% CO 6.61% argon and 20 ppm $CH_4$, This fraction is evaporated in exchanger 16, thus providing partly the refrigeration needed for cooling the incoming streams 1 and 3. After being warmed up to ambient temperature it is passed on to a pressure swing adsorption unit (PSA) 12, not shown in detail, for obtaining pure CO. By way of conduits 13 and 14, the pure CO, as the product, and a remaining residual gas are separately discharged from the PSA unit.

The third fraction produced in the nitrogen scrubbing operation is withdrawn at the bottom of the scrubbing column 2 with 82.8K and under 73.4 bar (conduit 15), and has the following composition:

9.48% $H_2$ 2.15% $N_2$ 43.45% CO 21.48% argon and 23.45% $CH_4$

It can thus clearly be seen that the bottom fraction contains practically all of the methane and only very little nitrogen. It is therefore an excellent fuel gas.

The fractions produced during the scrubbing operation (conduits 5, 10, 11 and 15) are all utilized in a heat exchanger 16 for cooling the crude gas mixture 1 as well as the high-pressure nitrogen 3 to the operating temperature of the nitrogen scrubbing step. With a correspondingly high delivery pressure of the residual gas streams (conduit 11 and 15), it may be necessary to equalize the refrigeration balance of the system by adding liquid nitrogen via conduit 17.

Figure 2:
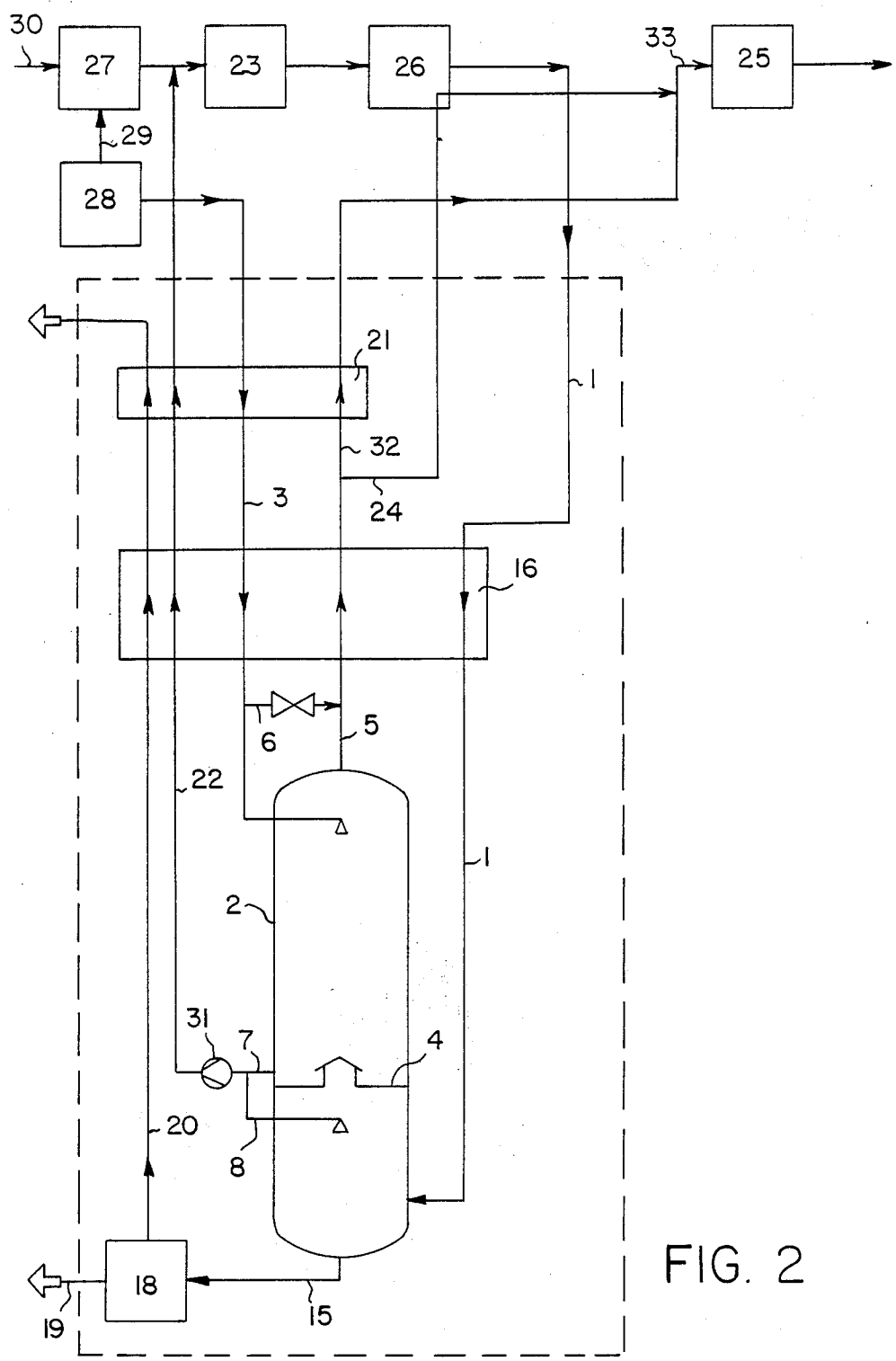
FIG. 2 illustrates incorporation of a nitrogen scrubbing step into an $NH_3$ production system.

FIG. 2 shows schematically the integration of a nitrogen scrubbing step of this invention (dashed-line area), already described above in connection with FIG. 1, into an $NH_3$ synthesis gas system. The individual parts of the $NH_3$ synthesis gas system are not illustrated in detail, because these items are well known in the open technical literature. All relevant aspects of a complete ammonia synthesis plant are discussed in great detail for instance in "Ammonia" (in four parts) edited by A. V. Slack and G. Russell James, Marcel Dekker Inc., New York.

The raw material (e.g., coal or oil) from conduit 30 of the illustrated ammonia plant is gasified by partial oxidation 27. The oxygen required for this purpose is supplied via conduit 29 by the air separation plant 28. The latter simultaneously supplies the nitrogen necessary for the scrubbing step (conduit 3). The thus-produced crude gas is subjected to a CO shift conversion 23 and to a sour gas removal by a cold methanol scrubbing unit 26.

Already precooled in the methanol scrubbing unit 26, the crude gas then passes via conduit 1 into the nitrogen scrubbing system, the design of which is practically identical to that already described in connection with FIG. 1, except that in this embodiment the side stream 7 is not expanded to provide hydrogen recycling. Instead, the side stream 7 is pumped by means of pump 31 to such a high pressure that the fraction enriched in CO can be returned via conduit 22 to a point upstream of the CO shift conversion 23. Furthermore, if needed, the bottom product of the scrubbing column 2 can be fed via conduit 15 to an argon production unit 18, not shown in detail. In this case, liquid argon is delivered as the product by way of conduit 19 whereas the remaining residual gas is removed via conduit 20.

The nitrogen-hydrogen ratio required for $NH_3$ synthesis is adjusted by adding further nitrogen (by way of conduit 6) into conduit 5 to the head product of the scrubbing column 2. The thus-produced $NH_3$ synthesis gas is first heated in heat exchanger 16 to the operating temperature of the sour gas scrubbing stage 26. Further heating of the synthesis gas to ambient temperature takes place, in part, in the exchanger 21 against nitrogen (via conduit 32), and in part within the sour gas scrubbing stage 26 against crude gas (via conduit 24) before the recombined total stream is fed via conduit 33 to the $NH_3$ synthesis 25, not illustrated in detail.

Figure 3:
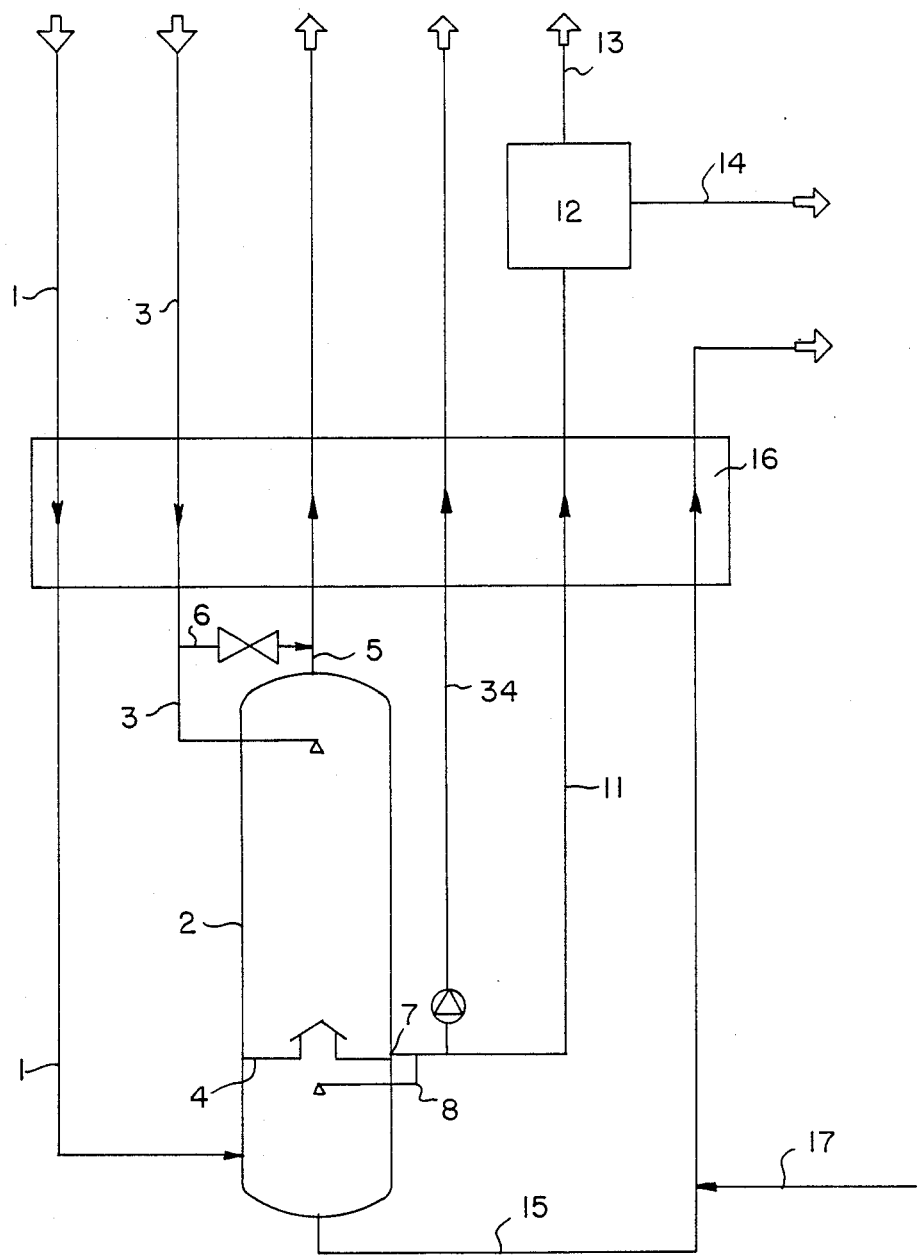
FIG. 3 illustrates a nitrogen scrubbing operation with recycling of CO to a $NH_3$ production unit (i.e., at a point upstream of a CO shift conversion step) and production of high purity CO by pressure swing adsorption.

The process according to FIG. 3 is practically identical to that of FIG. 1, except that the fraction 7, enriched with carbon monoxide, is not expanded but rather a partial stream 34 thereof is recycled to a point upstream of the CO shift conversion of an $NH_3$ production unit (not shown), and the remaining partial stream 11 is fed, analogously to FIG. 1, to a pressure swing adsorption unit 12. In the present example, the crude gas mixture is introduced by way of conduit 1 with 83K and 45 bar.

The compositions of the fractions entering into and exiting from the scrubbing column 2 are herein as follows:

| Conduit | 1 | 15 | 7 | 3 | 5 |
|---|---|---|---|---|---|
| $H_2$ | 93.13% | 6.71% | 8.64% | — | 91.9% |
| $N_2$ | 1.06% | 8.14% | 27.70% | 99.98% | 8.1% |
| CO | 4.63% | 52.40% | 56.49% | — | — |
| Ar | 0.69% | 11.32% | 7.17% | 0.02% | — |
| $CH_4$ | 0.49% | 21.43% | — | — | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for purifying a gaseous mixture consisting essentially of hydrogen and containing carbon monoxide and methane as impurities, comprising:

scrubbing said gaseous mixture with liquid nitrogen in a scrubbing column having an upper section and a lower section, the scrubbing liquid nitrogen being introduced into the upper section of the scrubbing column and in a quantity sufficient to substantially completely remove carbon monoxide from said gaseous mixture; and withdrawing a partial amount of said scrubbing liquid nitrogen, enriched with carbon monoxide, between said upper and lower sections, said partial amount withdrawn being dimensioned so that the remaining scrubbing liquid nitrogen, which is introduced into the lower section of the scrubbing column, is sufficient to substantially completely scrub out methane from said gaseous mixture in said lower section while leaving a substantial portion of carbon monoxide in said gaseous mixture.

2. A process according to claim 1, wherein said partial amount of scrubbing liquid withdrawn between said upper and lower sections of said scrubbing column contains at least about 20% of CO.

3. A process according to claim 2, wherein said partial amount of scrubbing liquid withdrawn between said upper and lower sections of said scrubbing column is delivered to a pressure swing adsorption unit in order to obtain a purified CO fraction.

4. A process according to claim 3, wherein said partial amount of scrubbing liquid withdrawn between said upper and lower sections of said scrubbing column is expanded to release hydrogen, prior to entering said pressure swing adsorption unit.

5. A process according to claim 4, wherein the hydrogen released during expansion of the scrubbing liquid is delivered to a sour gas scrubbing unit.

6. A process according to claim 2, wherein said partial amount of scrubbing liquid withdrawn between said upper and lower sections of said scrubbing column is delivered to a CO shift conversion step to obtain hydrogen.

7. A process according to claim 2, wherein a portion of said partial amount of scrubbing liquid withdrawn between said upper and lower sections of the scrubbing column is delivered to a CO shift conversion step to obtain hydrogen and another portion of said partial amount of scrubbing liquid is delivered to a pressure swing adsorption unit to obtain a purified CO fraction.

8. A process according to claim 2, wherein said gaseous mixture further contains argon as an impurity.

9. A process according to claim 8, wherein the fraction formed in the bottom of said scrubbing column is delivered to an argon production unit.

10. A process according to claim 1, wherein said partial amount of scrubbing liquid withdrawn between said upper and lower sections of said scrubbing column is delivered to a pressure swing adsorption unit in order to obtain a purified CO fraction.

11. A process according to claim 10, wherein said partial amount of scrubbing liquid withdrawn between said upper and lower sections of said scrubbing column is expanded to release hydrogen, prior to entering said pressure swing adsorption unit.

12. A process according to claim 11, wherein the hydrogen released during expansion of the scrubbing liquid is delivered to a sour gas scrubbing unit.

13. A process according to claim 1, wherein said partial amount of scrubbing liquid withdrawn between said upper and lower sections of said scrubbing column is delivered to a CO shift conversion step to obtain hydrogen.

14. A process according to claim 1, wherein a portion of said partial amount of scrubbing liquid withdrawn between said upper and lower sections of the scrubbing column is delivered to a CO shift conversion step to obtain hydrogen and another portion of said partial amount of scrubbing liquid is delivered to a pressure swing adsorption unit to obtain a purified CO fraction.

15. A process according to claim 1, wherein said gaseous mixture further contains argon as an impurity.

16. A process according to claim 15, wherein the fraction formed in the bottom of said scrubbing column is delivered to an argon production unit.

17. A process according to claim 1, wherein nitrogen is added to the product gas containing hydrogen discharged from the head of the scrubbing column and the resultant mixture is employed as synthesis gas in an ammonia production unit.

18. A process according to claim 1, wherein said gaseous mixture is obtained by the steps of oxidizing a carbonaceous feed material in a gasifier, subjecting the crude gas produced in the gasifier to a CO shift conversion step, and treating the gas discharged from the shift conversion step to sour gas removal in a methanol scrubber, and withdrawing from the methanol scrubber said gaseous mixture to be purified consisting essentially of hydrogen and containing carbon monoxide and methane as impurities; and further comprising withdrawing a head product gas from said nitrogen scrubbing column having an upper section and a lower section; and adding sufficient nitrogen to said head product gas to form a stoichiometric ammonia synthesis gas.

19. A process according to claim 18, wherein the partial amount of scrubbing liquid withdrawn between said upper and lower sections of the scrubbing column is recycled to a point upstream of the CO shift conversion step.

20. A process according to claim 18, further comprising an air separation unit for production of oxygen used during the oxidation of the carbonaceous feed material in the gasifier and production of nitrogen used as the scrubbing liquid nitrogen in the scrubbing column.

21. A process according the claim 18, wherein the gaseous mixture delivered to the scrubbing column further contains argon as an impurity and the fraction formed in the bottom of the scrubbing column is delivered to an argon production unit.

22. A process according to claim 18, wherein a portion of the liquid nitrogen to be used as scrubbing liquid in the scrubbing column is admixed with the product gas containing nitrogen and hydrogen discharged from the head of the scrubbing column in order to increase the nitrogen content thereof.

* * * * *